United States Patent
Okumura et al.

(10) Patent No.: US 6,498,459 B1
(45) Date of Patent: Dec. 24, 2002

(54) ELECTRONIC EQUIPMENT AND BATTERY UNIT

(75) Inventors: Masafumi Okumura, Kawasaki (JP); Hidekiyo Ozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/437,288

(22) Filed: Nov. 9, 1999

(30) Foreign Application Priority Data

Jan. 26, 1999 (JP) .......................................... 11-017610

(51) Int. Cl.[7] .................................................. H02J 7/00
(52) U.S. Cl. ........................................ 320/128; 320/127
(58) Field of Search ................................ 320/128, 127, 320/112, 114, 107, 164

(56) References Cited

U.S. PATENT DOCUMENTS

| | | | | |
|---|---|---|---|---|
| 5,477,130 A | * | 12/1995 | Hashimoto et al. | 320/164 |
| 5,534,765 A | * | 7/1996 | Kreisinger et al. | 320/106 |
| 5,568,039 A | * | 10/1996 | Fernandez | 320/150 |
| 5,606,242 A | | 2/1997 | Hull et al. | 320/106 |
| 5,783,998 A | | 7/1998 | Nakajou et al. | 324/426 |
| 6,133,708 A | * | 10/2000 | Nollet et al. | 320/107 |

FOREIGN PATENT DOCUMENTS

| | | |
|---|---|---|
| GB | 2 314 936 A | 1/1998 |
| JP | 5-30926 | 4/1993 |
| JP | 5-333974 | 12/1993 |
| JP | 8-308121 | 11/1996 |
| JP | 10-23674 | 1/1998 |
| JP | 10-187620 | 7/1998 |
| JP | 10-509857 | 9/1998 |

OTHER PUBLICATIONS

Smart Battery Data Specification—Revision 1.0; Feb. 15, 1995.

* cited by examiner

Primary Examiner—Edward H. Tso
Assistant Examiner—Lawrence Luk
(74) Attorney, Agent, or Firm—Armstrong, Westerman & Hattori, LLP

(57) ABSTRACT

An electronic equipment is connectable to a battery unit which includes an electronic circuit and a battery, and is provided with a power supply circuit to supply a power supply voltage directly to the electronic circuit.

36 Claims, 6 Drawing Sheets

ELECTRONIC EQUIPMENT AND BATTERY UNIT

BACKGROUND OF THE INVENTION

1. Field of the Invention

The present invention generally relates to electronic equipments and battery units (or sometimes also referred to as battery packs), and more particularly to an electronic equipment such as a personal computer which uses a detachable battery unit, and to a battery unit which is constructed to suppress deterioration of a battery thereof.

2. Description of the Related Art

Portable electronic equipments can generally be driven by a battery. However, in portable information processing apparatuses such as a lap-top personal computer, a discharge current is large and the battery is used up within a short time. For this reason, instead of using a disposable primary battery, it is more general to use a chargable secondary battery for such portable electronic equipments. In order to make the secondary battery easily replacable, and at the same time enable a long operation time by use of a plurality of batteries, the secondary battery is formed as a battery unit which is detachable with respect to the electronic equipment.

Recently, in order to enable a user to easily judge a usable time of the battery unit, there are demands to predict a remaining capacity of the battery unit. In addition, a so-called smart battery has been proposed, and such a battery unit not only includes a battery but also includes an electronic circuit which carries out operations such as calculating a capacity of the battery and storing battery information.

FIG. 1 is a system block diagram for explaining a conventional battery unit and an electronic equipment. An electronic equipment 1 includes terminals 2 through 5 and a microcontroller (or microcomputer) 6 which are connected as shown in FIG. 1. On the other hand, a battery unit 11 includes terminals 12 through 14, a battery 15, a power supply circuit 16, and an electronic circuit 17 which are connected as shown in FIG. 1.

When an external power supply such as an AC adapter 7 is connected to the terminal 2 of the electronic equipment 1, the electronic equipment 1 can use a power supply voltage from the external power supply. In addition, when the battery unit 11 is connected to the electronic equipment 1, the electronic equipment 1 can use a power supply voltage from the battery unit 11 via the terminals 12 and 3 and the terminal 14 and 5.

In the battery unit 11, the power supply voltage from the battery 15 is output via the terminals 12 and 14, and this power supply voltage is also supplied to the electronic circuit 17 via the power supply circuit 16. For example, the electronic circuit 17 includes a CPU, a memory or the like, and the supply of the power supply voltage to this electronic circuit 17 is only made via the power supply circuit 16.

Information is exchanged between the electronic circuit 17 and the microcontroller 6 within the electronic equipment 1 is made via the terminals 13 and 4.

However, in a state where the conventional battery unit 11 is stored by itself, the power supply circuit 16 constantly supplies the power supply voltage even though the internal electronic circuit 17 does not require the supply of the power supply voltage, and there is a problem in that the discharge of the battery 15 constantly occurs. For example, in a case where a non-volatile memory for storing battery information is provided within the electronic circuit 17 and the battery information is read by the microcontroller 6 when the battery unit 11 is connected to the electronic equipment 1, the power supply voltage only needs to be supplied to the electronic circuit 17 in the state where the battery unit 11 is connected to the electronic equipment 1. In a state where the battery unit 11 is not connected to the electronic equipment 1, that is, in the state where the battery unit 11 is stored by itself, the memory contents of the non-volatile memory within the electronic circuit 17 will be maintained even if the power supply voltage is not supplied to the electronic circuit 17, and in this state, it is unnecessary to supply the power supply voltage to the electronic circuit 17.

In addition, the power supply circuit 16 within the battery unit 11 may be provided with a function of stopping the supply of power when the voltage of the battery 15 becomes lower than a predetermined voltage. But in this case, the discharge of the battery 15 does not become zero even if the supply of power is stopped, and an extremely small current actually continues to flow. For this reason, in a case where the battery 15 is made up of a lithium-ion battery or the like which is vulnerable to excessive discharge, there is a problem in that the deterioration of the battery 15 continues even after the supply of power is stopped.

Furthermore, since the power supply voltage from the battery 15 is supplied to the electronic circuit 17 via the power supply circuit 16, the electronic circuit 17 is easily affected by the state of the battery 15. For example, in a case where the battery 15 is in an excessively discharged state and the voltage of the battery 15 is lower than the voltage required to operate the electronic circuit 17, even if the microcontroller 6 attempts to read information from the electronic circuit 17 when the battery unit 11 is connected to the electronic equipment 1, the information cannot be read from the electronic circuit 17 because the electronic circuit 17 will not operate. In other words, even though the electronic equipment 1 can operate using the external power supply, the electronic circuit 17 within the battery unit 11 uses the voltage of the battery 15, and the information cannot be read from the electronic circuit 17 until the voltage of the battery 15 rises to the voltage which can operate the electronic circuit 17.

Conventionally, in a case where the information cannot be read from the electronic circuit 17 due to the excessively discharged state of the battery 15, the battery 15 of the battery unit 11 is once charged via the electronic equipment 1, and the information is read from the electronic circuit 17 after the voltage of the battery 15 reaches the voltage required to operate the electronic circuit 17. But for example, an abnormal state of the battery unit 11 may have been detected already, and information indicating that the charging should be prohibited due to the abnormal state of the battery 15 may already have been written within the electronic circuit 17. However, this information indicating that the charging should be prohibited cannot be read by the microcontroller 6 until the battery 15 is charged.

SUMMARY OF THE INVENTION

Accordingly, it is a general object of the present invention to provide a novel and useful electronic equipment and battery unit, in which the problems described above are eliminated.

Another and more specific object of the present invention to provide an electronic equipment and a battery unit which eliminate the problems described above, by effectively suppressing a discharge of a battery when the battery unit is stored by itself so as to prevent deterioration of the battery, and by immediately reading information stored within the battery unit regardless of a state of the battery within the battery unit.

Still another object of the object of the present invention is to provide an electronic equipment connectable to a battery unit which includes a battery and an electronic circuit having the battery isolated as a power supply, comprising a power supply section supplying power to the electronic equipment. According to the electronic equipment of the present invention, it is possible to effectively suppress a discharge of a battery when the battery unit is stored by itself so as to prevent deterioration of the battery, and to immediately read information stored within the battery unit regardless of a state of the battery within the battery unit.

A further object of the present invention is to provide an electronic equipment connectable to a battery unit which includes a battery and an electronic circuit having the battery electrically disconnected therefrom, comprising a power supplying section supplying power to the electronic circuit. According to the electronic equipment of the present invention, it is possible to effectively suppress a discharge of a battery when the battery unit is stored by itself so as to prevent deterioration of the battery, and to immediately read information stored within the battery unit regardless of a state of the battery within the battery unit.

Another object of the present invention is to provide an electronic equipment connectable to a battery unit including a battery and an electronic circuit, comprising a power supply circuit supplying a power supply voltage directly to the electronic circuit. According to the electronic equipment of the present invention, it is possible to effectively suppress a discharge of a battery when the battery unit is stored by itself so as to prevent deterioration of the battery, and to immediately read information stored within the battery unit regardless of a state of the battery within the battery unit.

Still another object of the present invention is to provide an electronic equipment connectable to a battery unit which includes a battery and an electronic circuit, where the electronic circuit is isolated from the battery as a power supply within the battery unit, and the electronic equipment comprises a power supply section supplying power to the electronic circuit. According to the electronic equipment of the present invention, it is possible to effectively suppress a discharge of a battery when the battery unit is stored by itself so as to prevent deterioration of the battery, and to immediately read information stored within the battery unit regardless of a state of the battery within the battery unit.

A further object of the present invention is to provide an electronic equipment connectable to a battery unit which includes a battery and an electronic circuit, where the battery is connectable to the electronic equipment but being isolated from the electronic circuit as a power supply when the battery is disconnected from the electronic equipment, and the electronic equipment comprises a power supplying section supplying power to the electronic circuit. According to the electronic equipment of the present invention, it is possible to effectively suppress a discharge of a battery when the battery unit is stored by itself so as to prevent deterioration of the battery, and to immediately read information stored within the battery unit regardless of a state of the battery within the battery unit.

Another object of the present invention is to provide an electronic equipment connectable to a battery unit which includes a battery and electronic circuit, comprising a power input section receiving a supply of power from the battery, and a power supplying section supplying power to the electronic circuit of the battery unit. According to the electronic equipment of the present invention, it is possible to effectively suppress a discharge of a battery when the battery unit is stored by itself so as to prevent deterioration of the battery, and to immediately read information stored within the battery unit regardless of a state of the battery within the battery unit.

Still another object of the present invention is to provide an electronic equipment connectable to a battery unit which includes a battery and an electronic circuit, comprising a first terminal receiving a supply of power from the battery, and a second terminal supplying power to the electronic circuit of the battery unit. According to the electronic equipment of the present invention, it is possible to effectively suppress a discharge of a battery when the battery unit is stored by itself so as to prevent deterioration of the battery, and to immediately read information stored within the battery unit regardless of a state of the battery within the battery unit.

A further object of the present invention is to provide a battery unit comprising a battery, and an electronic circuit electrically insulated from the battery. According to the battery unit of the present invention, it is possible to effectively suppress a discharge of a battery when the battery unit is stored by itself so as to prevent deterioration of the battery, and to immediately read information stored within the battery unit regardless of a state of the battery within the battery unit.

Another object of the present invention is to provide a battery unit comprising a battery, and an electronic circuit having the battery isolated as a power supply. According to the battery unit of the present invention, it is possible to effectively suppress a discharge of a battery when the battery unit is stored by itself so as to prevent deterioration of the battery, and to immediately read information stored within the battery unit regardless of a state of the battery within the battery unit.

Still another object of the present invention is to provide a battery unit comprising a battery, and an electronic circuit electrically disconnected from the battery. According to the battery unit of the present invention, it is possible to effectively suppress a discharge of a battery when the battery unit is stored by itself so as to prevent deterioration of the battery, and to immediately read information stored within the battery unit regardless of a state of the battery within the battery unit.

A further object of the present invention is to provide a battery unit comprising a battery, and an electronic circuit receiving a supply of power directly from outside the battery unit. According to the battery unit of the present invention, it is possible to effectively suppress a discharge of a battery when the battery unit is stored by itself so as to prevent deterioration of the battery, and to immediately read information stored within the battery unit regardless of a state of the battery within the battery unit.

Another object of the present invention is to provide a battery unit comprising a battery, and an electronic circuit having the battery isolated as a power supply within the battery unit. According to the battery unit of the present invention, it is possible to effectively suppress a discharge of a battery when the battery unit is stored by itself so as to prevent deterioration of the battery, and to immediately read information stored within the battery unit regardless of a state of the battery within the battery unit.

Still another object of the present invention is to provide a battery unit comprising a battery, an electronic circuit, a power output section supplying power from the battery to an outside of the battery unit, and a power input section receiving a supply of power to the electronic circuit from the outside of the battery unit. According to the battery unit of the present invention, it is possible to effectively suppress a discharge of a battery when the battery unit is stored by itself so as to prevent deterioration of the battery, and to immediately read information stored within the battery unit regardless of a state of the battery within the battery unit.

A further object of the present invention is to provide a battery unit comprising a battery, an electronic circuit, a first terminal supplying power from the battery to an outside of the battery unit, and a second terminal receiving a supply of power to the electronic circuit from the outside of the battery unit. According to the battery unit of the present invention, it is possible to effectively suppress a discharge of a battery when the battery unit is stored by itself so as to prevent deterioration of the battery, and to immediately read information stored within the battery unit regardless of a state of the battery within the battery unit.

Another object of the present invention is to provide a battery unit connectable to an equipment, comprising a battery, an electronic circuit having the battery isolated as a power supply when the battery unit is disconnected from the equipment, and a power input section receiving a supply of power to the electronic circuit from an outside of the battery unit. According to the battery unit of the present invention, it is possible to effectively suppress a discharge of a battery when the battery unit is stored by itself so as to prevent deterioration of the battery, and to immediately read information stored within the battery unit regardless of a state of the battery within the battery unit.

Still another object of the present invention is to provide an apparatus comprising a battery unit which includes a battery and an electronic circuit having the battery isolated as a power supply, and an electronic equipment connectable to the battery unit and including a power supplying section supplying power to the electronic circuit. According to the apparatus of the present invention, it is possible to effectively suppress a discharge of a battery when the battery unit is stored by itself so as to prevent deterioration of the battery, and to immediately read information stored within the battery unit regardless of a state of the battery within the battery unit.

A further object of the present invention is to provide an apparatus comprising a battery unit which includes a battery and an electronic circuit electrically disconnected from the battery, and an electronic equipment connectable to the battery unit and including a power supplying section supplying power to the electronic circuit. According to the apparatus of the present invention, it is possible to effectively suppress a discharge of a battery when the battery unit is stored by itself so as to prevent deterioration of the battery, and to immediately read information stored within the battery unit regardless of a state of the battery within the battery unit.

Another object of the present invention is to provide an apparatus comprising a battery unit including a battery and an electronic circuit, and an electronic equipment, connectable to the battery unit, including a power input section receiving a supply of power from the battery, and a power supplying section supplying power to the electronic circuit of the battery unit. According to the apparatus of the present invention, it is possible to effectively suppress a discharge of a battery when the battery unit is stored by itself so as to prevent deterioration of the battery, and to immediately read information stored within the battery unit regardless of a state of the battery within the battery unit.

Still another object of the present invention is to provide an apparatus comprising a battery unit including a battery and an electronic circuit, and an electronic equipment, connectable to the battery unit, including a first terminal receiving a supply of power from the battery, and a second terminal supplying power to the electronic circuit of the battery unit. According to the apparatus of the present invention, it is possible to effectively suppress a discharge of a battery when the battery unit is stored by itself so as to prevent deterioration of the battery, and to immediately read information stored within the battery unit regardless of a state of the battery within the battery unit.

A further object of the present invention is to provide an apparatus comprising a battery unit including a battery and an electronic circuit, and an electronic equipment connectable to the battery unit, where the electronic circuit is isolated from the battery as a power supply when the battery unit is disconnected from the electronic equipment. According to the apparatus of the present invention, it is possible to effectively suppress a discharge of a battery when the battery unit is stored by itself so as to prevent deterioration of the battery, and to immediately read information stored within the battery unit regardless of a state of the battery within the battery unit.

Another object of the present invention is to provide an apparatus comprising a battery unit including a battery and an electronic circuit, and an electronic equipment connectable to the battery unit, where the battery unit supplies power to the electronic equipment from the battery of the battery unit, and the electronic equipment supplies power to the electronic circuit of the battery unit. According to the apparatus of the present invention, it is possible to effectively suppress a discharge of a battery when the battery unit is stored by itself so as to prevent deterioration of the battery, and to immediately read information stored within the battery unit regardless of a state of the battery within the battery unit.

Other objects and further features of the present invention will be apparent from the following detailed description when read in conjunction with the accompanying drawings.

DETAILED DESCRIPTION OF THE INVENTION

Embodiments of the present invention will now be described with reference to FIG. 2 and the subsequent drawings.

Figure 2:
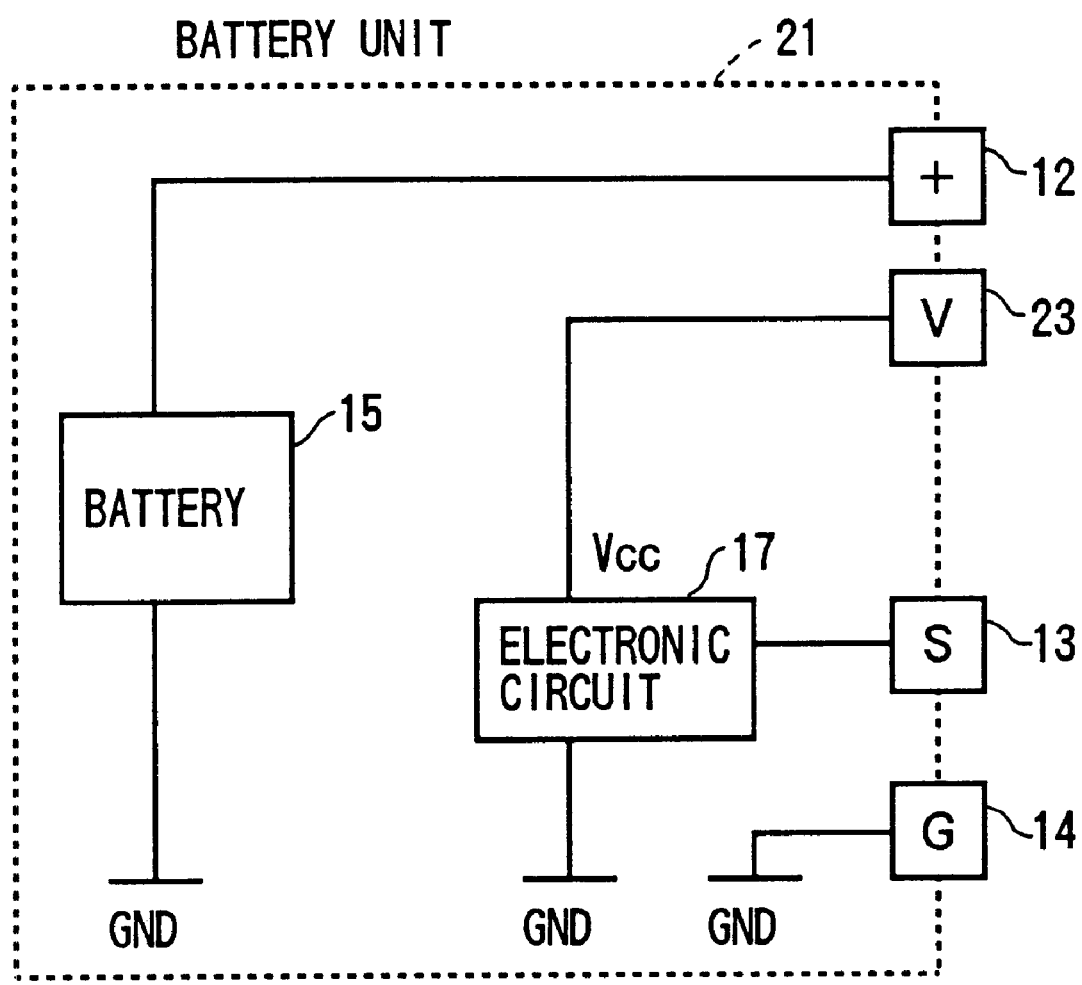
FIG. 2 is a system block diagram showing an important part of a first embodiment of a battery unit according to the present invention.

FIG. 2 is a system block diagram showing an important part of a first embodiment of a battery unit according to the present invention.

Figure 1:
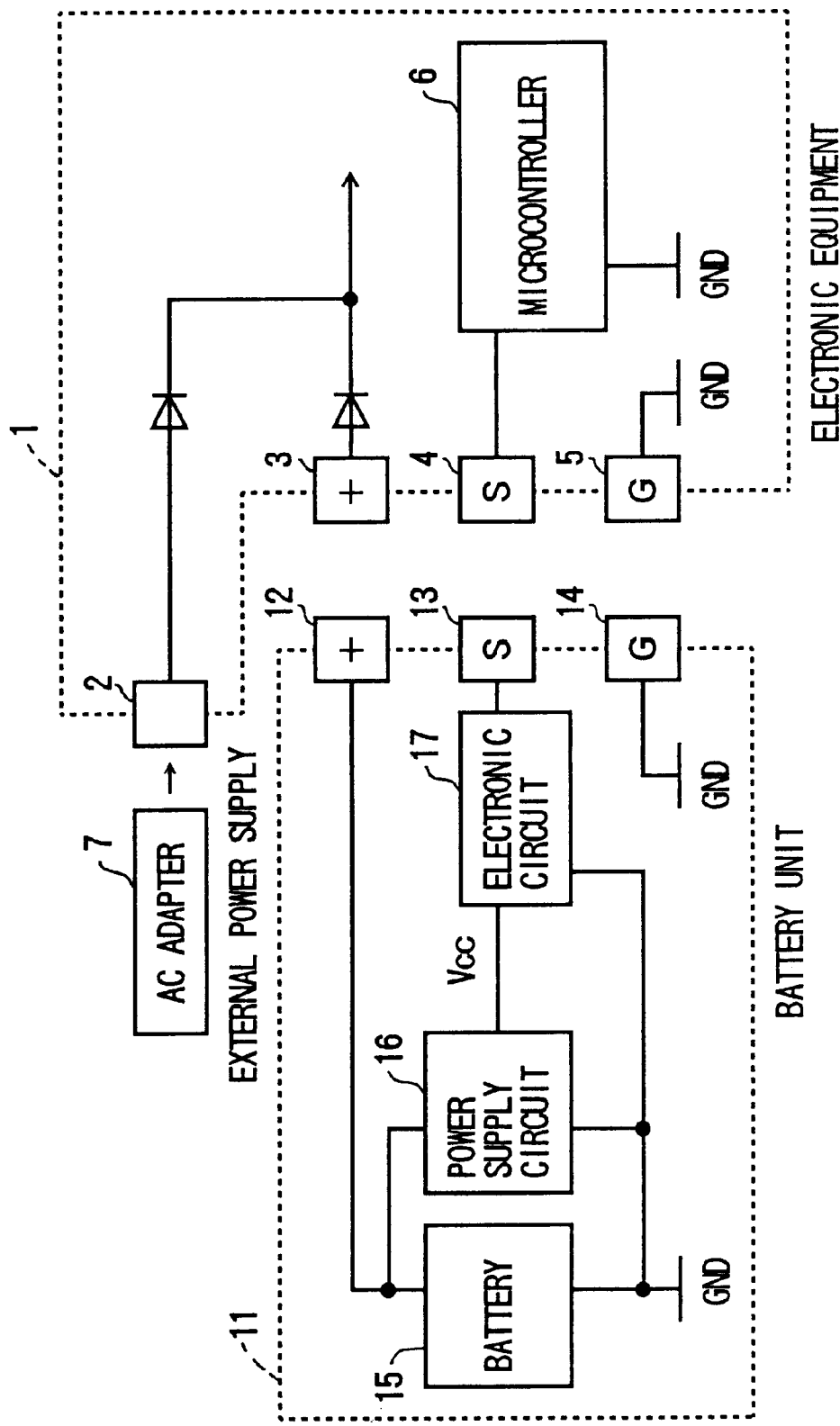
FIG. 1 is a system block diagram for explaining conventional battery unit and electronic equipment.

This embodiment of the battery unit is described as an embodiment of the present invention (refer to FIGS. 2 through 5). Of course, the present invention is not limited to specific names such as a battery unit and a battery pack. Any battery-including arrangement is included in the present invention. In FIG. 2, those parts which are the same as those corresponding parts in FIG. 1 are designated by the same reference numerals, and a description thereof will be omitted.

No power supply circuit 16 is provided within a battery unit 21 shown in FIG. 2. A power supply voltage to the electronic circuit 17 is supplied from the outside via terminals 23 and 14. In other words, the electronic circuit 17 is electrically insulated from the battery 15. For this reason, in a state where the battery unit 21 is stored by itself, no discharge of the battery 15 caused by the electronic circuit 17 occurs.

Information is exchanged between the electronic circuit 17 and an electronic equipment which is connected to the battery unit 21 or a microcontroller (or microcomputer) within the electronic equipment 1 described above, via the terminal 13.

Figure 3:
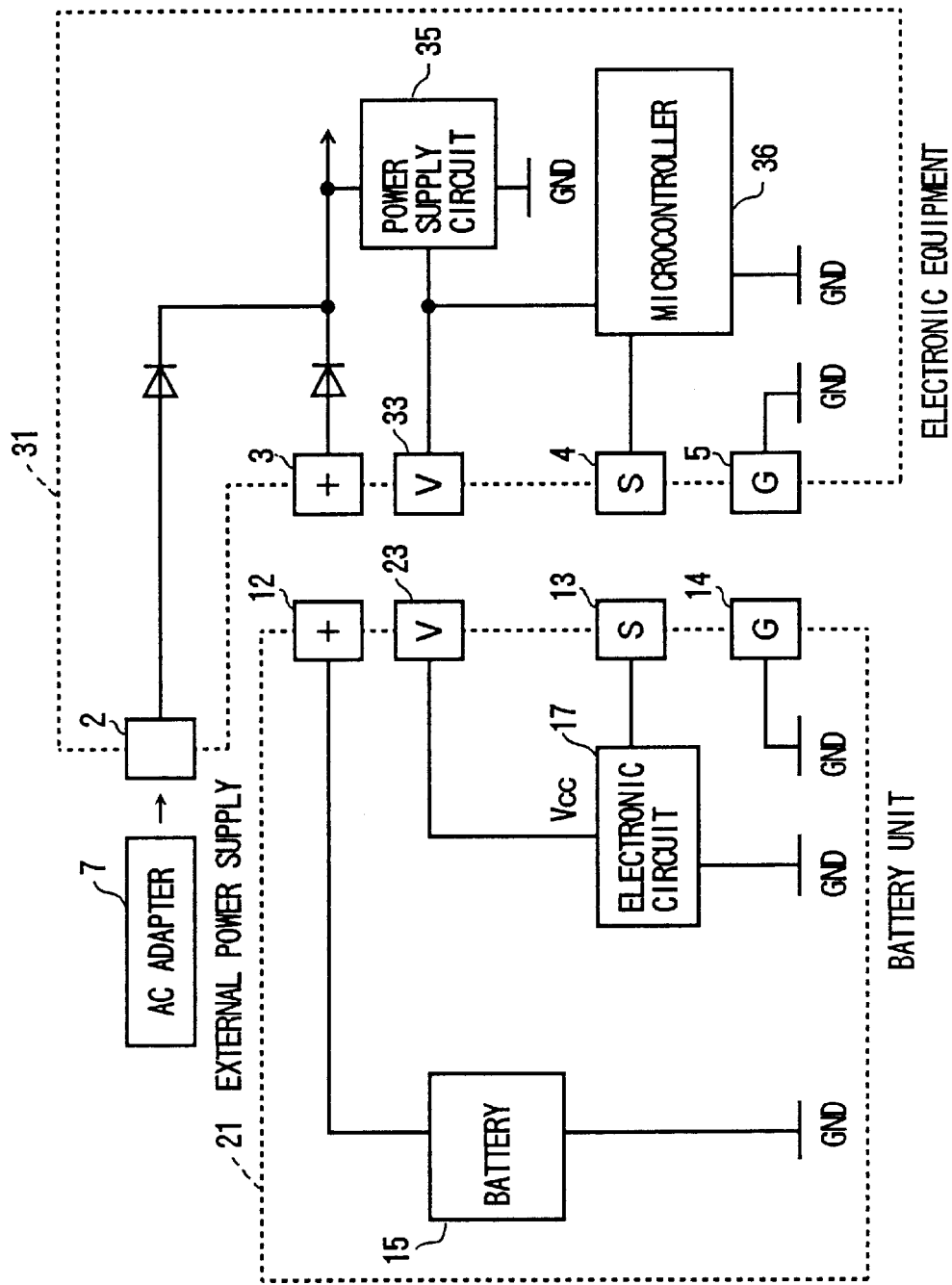
FIG. 3 is a system block diagram showing a first embodiment of an electronic equipment according to the present invention together with the battery unit shown in FIG. 2.

FIG. 3 is a system block diagram showing a first embodiment of an electronic equipment according to the present invention, together with the battery unit 21 described above. In FIG. 3, those parts which are the same as those corresponding parts in FIG. 1 are designated by the same reference numerals, and a description thereof will be omitted.

A power supply circuit 35 is provided within an electronic equipment 31 shown in FIG. 3. This power supply circuit 31 supplies the power supply voltage from the battery 15 to various parts of the electronic equipment 31, including a microcontroller (or a microcomputer) 36, when the battery unit 21 is connected to the electronic equipment 31 and a present remaining capacity of the battery 15 is greater than or equal to a predetermined value. On the other hand, when the battery unit 21 is not connected to the electronic equipment 31 and the electronic equipment 31 is connected to an external power supply such as the AC adapter 7 or, the battery unit 21 is connected to the electronic equipment 31 but the present remaining capacity of the battery 15 is less than the predetermined value, the power supply circuit 35 supplies a power supply voltage from the external power supply to the various parts of the electronic equipment 31, including the microcontroller 36. Furthermore, the power supply voltage from the power supply circuit 35 is supplied to the electronic circuit 17 within the battery unit 21 via terminals 33 and 23 and the terminals 5 and 14.

Information is exchanged between the electronic circuit 17 and the microcontroller 36 within the electronic equipment 31 via the terminals 13 and 4.

In this embodiment, the electronic circuit 17 includes a non-volatile memory element. For example, this non-volatile memory element stores one information selected from a group which includes information related to at least one of regular voltage, current temperature, capacity and serial number of the battery 15, and information related to the present remaining capacity of the battery 15.

The information which does not change, such as the information related to the regular voltage and serial number, is basically written in advance when the battery unit 21 is manufactured. On the other hand, the information which changes, such as the information related to the remaining capacity, is initially written when the battery unit 21 is manufactured, and is thereafter written by the microcontroller 36 via the terminals 13 and 4. The microcontroller 36 obtains the remaining capacity by accumulating the flowing current via the terminals 12 and 3 and subtracting the accumulated value from a fully charged capacity. The remaining capacity obtained is written into the non-volatile memory element of the electronic circuit 17 via the terminals 13 and 4. As a method of measuring the flowing current, it is possible, for example, to use a resistor 51 and a measuring circuit 53 shown in FIG. 5 which will be described later. Alternatively, a resistor (corresponding to the resistor 51 shown in FIG. 5) may be connected between a diode which is provided between the electronic equipment 31 and the terminal 3 and a diode which is provided between the terminal 3 and the power supply circuit 35, and a terminal voltage across this resistor may be measured by the microcontroller 36 to obtain the current value of the flowing current.

Accordingly, even if the present remaining capacity of the battery 15 within the battery unit 21 which is connected to the electronic equipment 31 is zero, the microcontroller 36 of the electronic equipment 31 can use the power supply voltage supplied from the power supply circuit 35 within the electronic equipment 31 and read information from and/or write information to the electronic circuit 17 within the battery unit 21 via the terminals 13 and 4. For this reason, if information indicating that the charging should be prohibited due to a battery abnormality is written in the non-volatile memory element within the electronic circuit 17, for example, the microcontroller 36 can prohibit the charging operation with respect to the battery unit 21.

The battery abnormality can be judged by the microcontroller 36 when the voltage of the battery 15 does not increase or the fully charged capacity becomes small. When the battery abnormality is judged, the microcontroller 36 writes the information which indicates that the charging should be prohibited into the non-volatile memory element of the electronic circuit 17, via the terminals 13 and 4.

The voltage of the battery 15 can be detected, by measuring a voltage at the terminal 3 by the microcontroller 36. If this voltage does not increase, the microcontroller 36 judges the battery abnormality, and writes the information which indicates that the charging should be prohibited into the non-volatile memory element of the electronic circuit 17, via the terminals 13 and 4.

The fully charged capacity can be obtained in the following manner. The initial value of the fully charged capacity is written advance into the non-volatile memory element of the electronic circuit 17 when the battery unit 21 is manufactured. Thereafter, the current flowing from the terminal 3 to the electronic equipment 31 (that is, the above described flowing current which is measured) is accumulated from a state where the battery 15 is fully charged to a state where the remaining capacity is approximately zero, so as to obtain the fully charged capacity of the battery 15. The fully charged capacity which is obtained in this manner is updated as a new fully charged capacity. The updated fully charged capacity is written into the non-volatile memory element of the electronic circuit 17 via the terminals 4 and 13.

When the battery 15 deteriorates and the fully charged capacity becomes small, the microcontroller 36 judges the battery abnormality, and stores the information which indicates that the charging should be prohibited into the non-volatile memory element of the electronic circuit 17, via the terminals 13 and 4.

On the other hand, when the charging operation with respect to the battery unit 21 is not prohibited, the charging operation with respect to the battery unit 21 can be carried out in parallel with the reading of the information from and/or the writing of the information to the electronic circuit 17 within the battery unit 21 by the microcontroller 36.

The battery unit itself which is provided with an electronic circuit having a memory or the like is known, and for this reason, description and illustration of the specific construction within the electronic circuit 17 will be omitted. In addition, a microcontroller (or microcomputer) itself within an electronic equipment which reads information from and/or writes information to the memory within the electronic circuit is also known, and thus, a detailed description related to the operation of reading information from and/or writing information with respect to the electronic circuit 17 within the battery unit 21 by the microcontroller 36 will be omitted.

Figure 4:
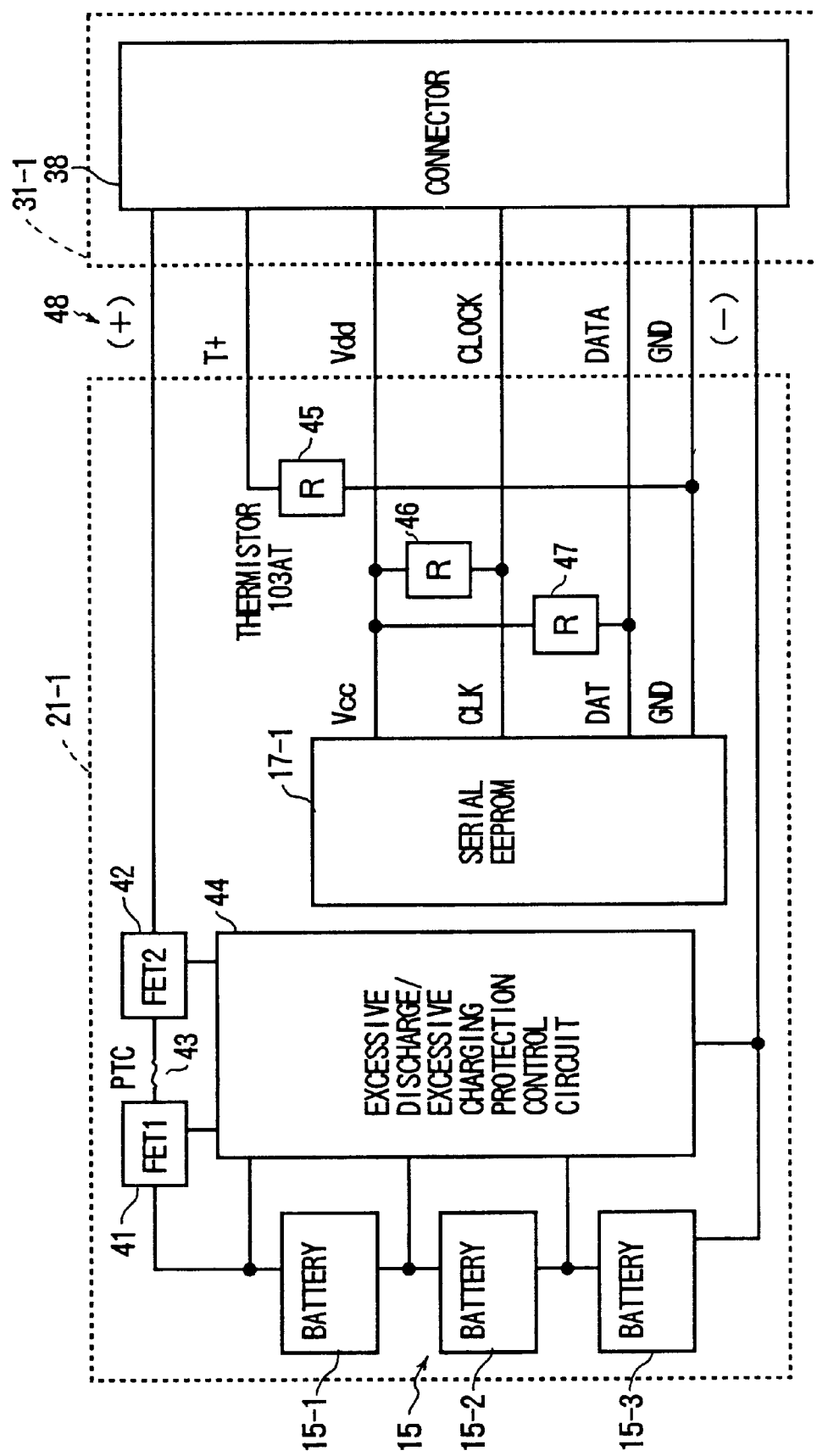
FIG. 4 is a system block diagram showing a second embodiment of the battery unit according to the present invention.

Next, a description will be given of a second embodiment of the battery unit according to the present invention, by referring to FIG. 4. FIG. 4 is a system block diagram showing this second embodiment of the battery unit. In FIG. 4, those parts which are the same as those corresponding parts in FIG. 2 are designated by the same reference numerals, and a description thereof will be omitted.

A battery unit 21-1 includes lithium-ion batteries 15-1 through 15-3, switching elements 41 and 42 made up of FETs, for example, a fuse 43, an excessive discharge and/or excessive charging protection control circuit 44, a serial EEPROM 17-1, a thermistor 45, and a terminal group 48 which are connected as shown in FIG. 4. The lithium-ion batteries 15-1 through 15-3 form the battery 15. Resistors 46 and 47 are provided as pull-up resistors.

The excessive discharge and/or excessive charging protection control circuit 44 is a known circuit which is provided to protect an excessive discharge and/or an excessive charging of the battery 15. The excessive discharge and/or excessive charging protection control circuit 44 prevents the excessive discharge and/or excessive charging by controlling ON/OFF states of the switching elements 41 and 42 depending on the state of the battery 15. The fuse 43 is also a known element which cuts a current path when an excessively large current flows through the fuse 43, so as to protect the battery 15.

For example, an excessive discharge and/or excessive charging protection control circuit described in a Japanese Laid-Open Patent Application No. 10-23674 entitled "Battery Remaining Capacity Predicting Method, Battery Unit and Apparatus Using Battery Unit" laid open on Jan. 23, 1998 may be used for the excessive discharge and/or excessive charging protection control circuit 44 described above. The Japanese Laid-Open Patent Application No. 10-23674 describes the construction and operation related to the excessive discharge and/or excessive charging protection control circuit 44 and the switching elements 41 and 42, but a brief description will be given hereunder. The excessive discharge and/or excessive charging protection control circuit 44 is provided within the battery unit 21-1. In this circuit 44, a voltage comparator is provided with respect to each of the batteries 15-1 through 15-3. In this embodiment, the 3 batteries 15-1 through 15-3 are connected in series, and each voltage comparator is supplied with an output voltage of a corresponding one of the batteries 15-1 through 15-3 and a reference voltage e1 which indicates an excessive discharge limit voltage of the batteries 15-1 through 15-3. The switching element 42 is made of the FET. Each voltage comparator outputs a high-level signal when the voltage from the corresponding one of the batteries 15-1 through 15-3 becomes less than or equal to the reference voltage e1. Accordingly, when one of the voltage comparators outputs a high-level signal, the switching element 42 is turned OFF in response to the high-level signal, and battery unit 21 is disconnected from an electronic equipment 31-1. As a result, when the output voltage of at least one of the batteries 15-1 through 15-3 becomes less than or equal to the excessive discharge limit voltage, the output from the battery unit 21-1 is cut off, so as to prevent the excessive discharge of the batteries 15-1 through 15-3. In FIG. 4, the battery unit 21-1 is further provided with the switching element 41. In addition, the excessive discharge and/or excessive charging protection control circuit 44 is further provided with second voltage comparators corresponding to the batteries 15-1 through 15-3. The electronic equipment 31-1 is further provided with a charger (not shown). An excessive charging prevention circuit is formed by a part of the excessive discharge and/or excessive charging protection control circuit 44 and the switching element 41. Each of the second voltage comparators is supplied with the output voltage of the corresponding one of the batteries 15-1 through 15-3 and a reference voltage e2 which indicates an excessive charging limit voltage. Each second voltage comparator outputs a high-level signal when the voltage from the corresponding one of the batteries 15-1 through 15-3 becomes greater than or equal to the reference voltage e2 which is different from the reference voltage e1 described above. Hence, when one of the second voltage comparators outputs a high-level signal, the switching element 41 is turned OF in response to this high-level signal, and the battery unit 21-1 is disconnected from the electronic equipment 31-1. Consequently, when the output voltage of at least one of the batteries 15-1 through 15-3 becomes greater than or equal to the excessive charging limit voltage, the battery unit 21-1 is cut off from the charger of the electronic equipment 31-1, so as to prevent the excessive charging of the batteries 15-1 through 153.

The serial EEPROM 17-1 stores one information selected from a group which includes information related to at least one of regular voltage, current temperature, capacity and serial number of the battery 15, and information related to the present remaining capacity of the battery 15. The remaining capacity may be obtained similarly to the case described above in conjunction with FIG. 3. The serial EEPROM 17-1 is connected to the thermistor 45 via the terminal group 48, but is electrically insulated from the battery 15, so that no power supply voltage from the battery 15 is supplied to the serial EEPROM 17-1. The serial EEPROM 17-1 includes a power supply voltage input terminal Vcc, a clock input terminal CLK, a data input terminal DAT, and a ground terminal GND. The terminal group 48 includes a terminal (+) corresponding to the terminal 12, terminals T+ and Vdd corresponding to the terminal 23, terminals CLOCK and DATA corresponding to the terminal 13, and terminals GND and (−) corresponding to the terminal 14. The serial EEPROM 17-1 and the thermistor 45 form the electronic circuit. When the battery unit 21-1 is connected to the electronic equipment 31-1, the terminal group 48 is connected to a connector 38 of the electronic equipment 31-1.

The thermistor 45 is used to measure a temperature within the battery unit 21-1. It is possible to measure the temperature within the battery unit 21-1 by measuring the voltage at the terminal T+ in the electronic equipment 31-1.

The electronic equipment 31-1 includes the microcontroller 36 identical to that of the electronic equipment 31 described above and shown in FIG. 3. The terminals as described above, the terminals CLOCK and DATA shown in FIG. 4 correspond to the terminal 13 shown in FIG. 3. In addition, the terminal Vdd shown in FIG. 4 corresponds to the terminal 23 shown in FIG. 3. The methods of storing the information related to the remaining capacity and the battery abnormality into the serial EEPROM 17-1 may be the same as those described above in conjunction with FIG. 3.

The construction of the electronic equipment 31-1 in stages subsequent to the connector 36 is the same as that of the electronic equipment 31 shown in FIG. 3, for example.

Figure 5:
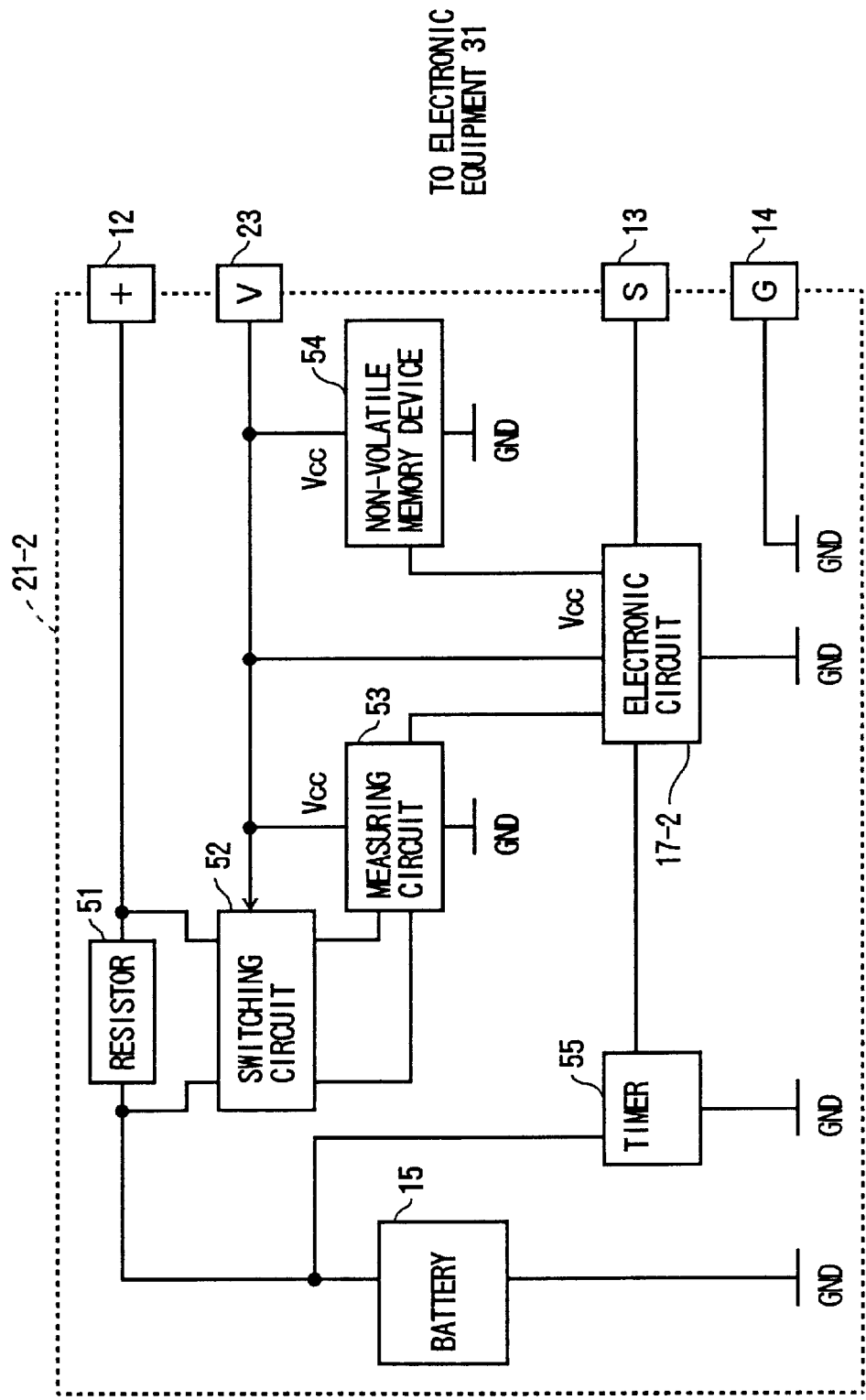
FIG. 5 is a system block diagram showing a third embodiment of the battery unit according to the present invention.

Next, a description will be given of a third embodiment of the battery unit according to the present invention, by referring to FIG. 5. FIG. 5 is a system block diagram showing this third embodiment of the battery unit. In FIG. 5, those parts which are the same as those corresponding parts in FIG. 2 are designated by the same reference numerals, and a description thereof will be omitted.

A battery unit 21-2 includes the battery 15, an electronic circuit 17-2 including a microcontroller (or microcomputer), a resistor 51, a switching circuit 52, a measuring circuit 53, a non-volatile memory device 54, a timer 55, and terminals 12 through 14 and 23 which are connected as shown in FIG. 5. At least one of the switching circuit 52, the measuring circuit 53 and the non-volatile memory device 54 may be provided within the electronic circuit 17-2. When the battery unit 21-2 is connected to the electronic equipment 31 (not shown), the supply of the power supply voltage to the electronic circuit 17-2, the resistor 51, the switching circuit 52, the measuring circuit 53 and the non-volatile memory device 54 is made from the power supply circuit 35 within the electronic equipment 31, but otherwise, the basic construction of the battery unit 21-2 is the same as the so-called smart battery.

Examples of the known smart battery may be found in Smart Battery Data Specification Revision 1.0 Feb. 15, 1995 Copyright 1996, Benchmarq Microelectronics Inc., Duracell Inc., Energizer Power Systems, Intel Corporation, Linear Technology, Maxim Integrated Products, Mitsubishi Electric Corporation, National Semiconductor Corporation, Toshiba Battery Co., Varra Baterie AG, All rights reserved.

For example, the non-volatile memory device 54 stores a current value detected upon completion of the charging, a fully charged capacity (rated capacity), a time set for an excessive charging preventing timer, a tolerable temperature range for the charging, a table of open voltages and remaining capacities, battery information, various parameters used for predicting the remaining capacity, and the like.

In a case where the battery 15 is made up of a lithium-ion battery, the charging current decreases as the charging progresses, and it is judged that battery 15 is fully charged when the charging current becomes less than or equal to a regular current value. The above described current value detected upon completion of the charging, refers to this regular current value. The fully charged capacity described above is used when calculating the remaining capacity of the battery 15. The above described time set for the excessive charging preventing timer is used as a setting time of a charging timer for preventing an excessive charging when the completion of the charging cannot be detected for some reason. When the battery 15 is not charged under a predetermined temperature range, an excessive charging may occur to accelerate the deterioration of the battery 15 or in an extreme case cause explosion of the battery 15. For this reason, the tolerable temperature range for the charging is set so as to prevent the charging outside the predetermined temperature range.

In the case where the battery 15 is made up of the lithium-ion battery, it is possible to predict to a certain extent the remaining capacity of the battery 15 based on the battery voltage in an open state where no current flows. The table of open voltages and remaining capacities described above is used to predict the remaining capacity of the battery 15 from the open voltage. In addition, the battery information described above includes product information (name of model), serial number, date (day, month and year) of manufacture and the like related to the battery unit 21-2.

The switching circuit 52 is turned ON when supplied with an external power supply voltage, that is, the power supply voltage from the electronic equipment 31 via the terminal 23. When turned ON, the switching circuit 52 enables the measuring circuit 53 connected thereto to measure the voltage, current and the like of the battery 15. The measuring circuit 53 can detect the voltage across the terminals of the resistor 51 so as to detect the current value. In addition, the measuring circuit 53 can measure the voltage at a node which connects the resistor 51 and the switching circuit 52 at the upper left hand side in FIG. 5, so as to detect the voltage of the battery 15. On the other hand, the power supply voltage from the batter 15 is supplied directly to the timer 55. This timer 55 measures a time for which the battery unit 21-2 is disconnected from the electronic equipment 31, and supplies the measured time to the microcontroller within the electronic circuit 17-2.

In a state where the battery unit 21-2 is connected to the electronic equipment 31, the microcontroller within the electronic circuit 17-2 operates based on the power supply voltage which is supplied from the power supply circuit 35 within the electronic equipment 31 via the terminal 23. This microcontroller within the electronic circuit 17-2 measures the voltage of the battery 15, the discharge current from the battery 15, the charging current to the battery 15 and the like via the measuring circuit 53, and predicts the remaining capacity of the battery 15. The predicted remaining capacity of the battery 15 is supplied to the microcontroller 36 within the electronic equipment 31 via the terminal 13, and is stored in the non-volatile memory device 54 if necessary.

The method of calculating the remaining capacity of the battery 15 may be the same as that used in the embodiment shown in FIG. 3. In the embodiment shown in FIG. 3, the calculation (or prediction) of the remaining capacity is made by the microcontroller 36. However, in this embodiment shown in FIG. 5, the current value is measured by the resistor 51 and the measuring circuit 53, and the electronic circuit 17-2 uses the measured current value to calculate (or predict) the remaining capacity of the battery 15.

On the other hand, in a state where the battery unit 21-2 is not connected to the electronic equipment 31, no power supply voltage is supplied to the electronic circuit 17-2 and the like. For this reason, when calculating the remaining capacity of the battery 15, it is not possible to employ the general method employed by the conventional smart battery which subtracts the self-discharge of the battery measured in advance and the power consumption within the battery unit, at predetermined time intervals. Accordingly, in this embodiment, information such as the remaining capacity of the battery 15 is stored in the non-volatile memory device 54 in the state where the battery unit 21-2 is connected to the electronic equipment 31. Consequently, when the battery unit 21-2 is reconnected to the electronic equipment 31 after being stored by itself, the microcontroller within the electronic circuit 17-2 detects the time for which the battery unit 21-2 was disconnected from the electronic equipment 31 from the information from the timer 55, and calculates the discharge quantity of the battery 15 during this time when the battery unit 21-2 was disconnected from the electronic equipment 31. By subtracting this discharge quantity from the remaining capacity stored in the non-volatile memory device 54, the microcontroller within the electronic circuit 17-2 can predict the present remaining capacity of the battery 15.

Figure 6:
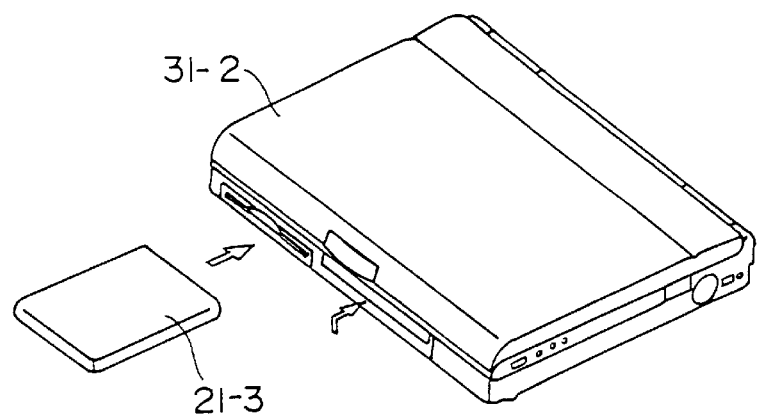
FIG. 6 is a perspective view showing a second embodiment of the electronic equipment according to the present invention.

FIG. 6 is a perspective view showing a second embodiment of the electronic equipment according to the present invention. In this embodiment, the present invention is applied to a portable personal computer.

In FIG. 6, an important part of a portable personal computer 31-2 has a construction similar to that of the electronic equipment 31 shown in FIG. 3, for example. A known construction may be used for the other parts of the portable personal computer 31-2. In addition, a battery unit 21-3 has a construction similar to any one of the battery unit 21 shown in FIG. 2, the battery unit 21-1 shown in FIG. 4, and the battery unit 21-2 shown in FIG. 5.

Figure 7:
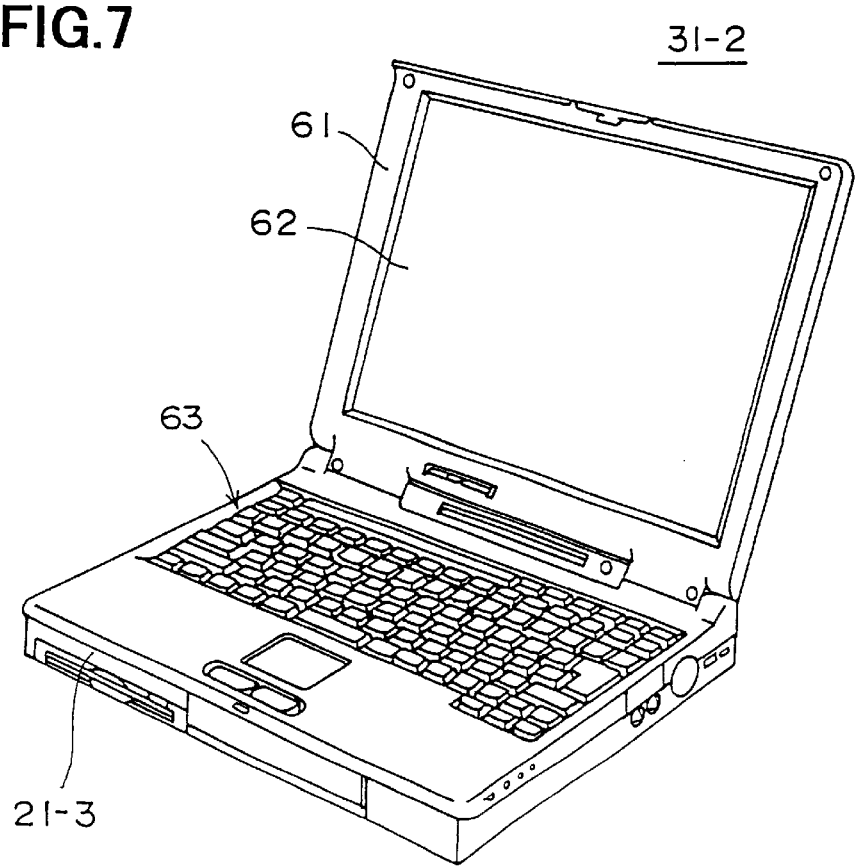
FIG. 7 is a perspective view showing the second embodiment of the electronic equipment in a state where a lid is open.

FIG. 7 is a perspective view showing a state where a lid 61 of the portable personal computer 31-2 shown in FIG. 6 is open. In FIG. 7, the portable personal computer 31-2 includes a display 62 which is provided on the inner side of the lid 61, a keyboard 63, and the like. The battery unit 21-3 is inserted from a front part of the portable personal computer 31-2.

In this embodiment, the portable personal computer forms the electronic equipment. However, the application of the present invention is of course not limited to the portable personal computer. The present invention is similarly applicable to various other electronic equipments which use a battery, such as Personal Digital Assistance (PDA) equipments, electronic memo devices, and video cameras.

Therefore, according to the present invention, it is possible to effectively suppress a discharge of a battery when the battery unit is stored by itself so as to prevent deterioration of the battery, and to immediately read information stored within the battery unit regardless of a state of the battery within the battery unit.

Further, the present invention is not limited to these embodiments, but various variations and modifications may be made without departing from the scope of the present invention.

What is claimed is:

1. An electronic equipment connectable to a battery unit which includes a battery and an electronic circuit having the battery isolated as a power supply, comprising:
   a power supply section supplying power to the electronic circuit.

2. An electronic equipment connectable to a battery unit which includes a battery and an electronic circuit having the battery electrically disconnected therefrom, comprising:
   a power supplying section supplying power to the electronic circuit.

3. An electronic equipment connectable to a battery unit including a battery and an electronic circuit, comprising:
   a power supply circuit supplying a power supply voltage directly to the electronic circuit.

4. An electronic equipment connectable to a battery unit which includes a battery and an electronic circuit, said electronic circuit being isolated from the battery as a power supply within the battery unit, said electronic equipment comprising:
   a power supply section supplying power to the electronic circuit.

5. An electronic equipment connectable to a battery unit which includes a battery and an electronic circuit, said battery being connectable to the electronic equipment but being isolated from the electronic circuit as a power supply when the battery is disconnected from the electronic equipment, said electronic equipment comprising:
   a power supplying section supplying power to the electronic circuit.

6. An electronic equipment connectable to a battery unit which includes a battery and electronic circuit, comprising:
   a power input section receiving a supply of power from the battery; and
   a power supplying section supplying power to the electronic circuit of the battery unit.

7. An electronic equipment connectable to a battery unit which includes a battery and an electronic circuit, comprising:
   a first terminal receiving a supply of power from the battery; and
   a second terminal supplying power to the electronic circuit of the battery unit.

8. The electronic equipment as claimed in claim 1, which further comprises a terminal supplying a power supply voltage from said power supplying section to the electronic circuit.

9. The electronic equipment as claimed in any of claims 1 to 7, which further comprises a controller judging whether or not to supply a power supply voltage to the battery within the battery unit.

10. The electronic equipment as claimed in claim 9, wherein said controller makes a judgement based on information from the electronic circuit.

11. The electronic equipment as claimed in any of claims 1 to 7, which further comprises a terminal inputting information from the electronic circuit.

12. The electronic equipment as claimed in any of claims 1 to 7, which further comprises an information output section outputting information to the electronic circuit.

13. The electronic equipment as claimed in claim 12, which further comprises a terminal outputting information to the electronic circuit.

14. The electronic equipment as claimed in any of claims 1 to 7, which further comprises a controller which carries out at least one of a data read or a data write with respect to the electronic circuit.

15. The electronic equipment as claimed in any of claims 1 to 8, wherein the electronic circuit is electrically insulated from the battery within the battery unit.

16. A battery unit comprising:
   a battery; and
   an electronic circuit electrically insulated from the battery.

17. A battery unit comprising:
   a battery; and
   an electronic circuit having the battery isolated as a power supply.

18. A battery unit comprising:
   a battery; and
   an electronic circuit electrically disconnected from the battery.

19. A battery unit comprising:
   a battery; and
   an electronic circuit receiving a supply of power directly from outside the battery unit.

20. A battery unit comprising:

a battery; and an electronic circuit having the battery isolated as a power supply within the battery unit.

21. A battery unit comprising:

a battery;

an electronic circuit;

a power output section supplying power from the battery to an outside of the battery unit; and a power input section receiving a supply of power to the electronic circuit from the outside of the battery unit.

22. A battery unit comprising:

a battery;

an electronic circuit;

a first terminal supplying power from the battery to an outside of the battery unit; and a second terminal receiving a supply of power to the electronic circuit from the outside of the battery unit.

23. A battery unit connectable to an equipment, comprising:

a battery;

an electronic circuit having the battery isolated as a power supply when the battery unit is disconnected from the equipment; and a power input section receiving a supply of power to the electronic circuit from an outside of the battery unit.

24. The battery unit as claimed in any of claims 16 to 23, which further comprises a terminal supplying an external power supply voltage to the electronic circuit.

25. The battery unit as claimed in any of claims 16 to 23, which further comprises a terminal which inputs external information to and/or externally outputs information from the electronic circuit.

26. The battery unit as claimed in any of claims 16 to 23, wherein said electronic circuit includes a storage device.

27. The battery unit as claimed in claim 26, wherein said storage device stores information related to the battery.

28. The battery unit as claimed in claim 26, wherein said storage device stores one information selected from a group which includes information related to at least one of regular voltage, current temperature, capacity and serial number of the battery, and information related to a present remaining capacity of the battery.

29. The battery unit as claimed in any of claims 16 to 23, wherein the battery supplies power to an equipment external to the battery unit.

30. An apparatus comprising:

a battery unit which includes a battery and an electronic circuit having the battery isolated as a power supply; and an electronic equipment connectable to said battery unit and including a power supplying section supplying power to the electronic circuit.

31. An apparatus comprising:

a battery unit which includes a battery and an electronic circuit electrically disconnected from the battery; and an electronic equipment connectable to said battery unit and including a power supplying section supplying power to the electronic circuit.

32. An apparatus comprising:

a battery unit including a battery and an electronic circuit; and an electronic equipment, connectable to said battery unit, including a power input section receiving a supply of power from the battery, and a power supplying section supplying power to the electronic circuit of said battery unit.

33. An apparatus comprising:

a battery unit including a battery and an electronic circuit; and an electronic equipment, connectable to said battery unit, including a first terminal receiving a supply of power from the battery, and a second terminal supplying power to the electronic circuit of said battery unit.

34. An apparatus comprising:

a battery unit including a battery and an electronic circuit; and an electronic equipment connectable to said battery unit, said electronic circuit being isolated from the battery as a power supply when said battery unit is disconnected from said electronic equipment.

35. An apparatus comprising:

a battery unit including a battery and an electronic circuit; and an electronic equipment connectable to said battery unit, said battery unit supplying power to said electronic equipment from the battery of said battery unit, said electronic equipment supplying power to the electronic circuit of said battery unit.

36. The apparatus as claimed in any of claims 30 to 35, wherein the electronic circuit of said battery unit inputs information from and/or outputs information to said electronic equipment.

* * * * *